(12) United States Patent
Davidson

(10) Patent No.: US 11,727,507 B1
(45) Date of Patent: Aug. 15, 2023

(54) GIFTING APPLICATION

(71) Applicant: Curt Davidson, San Marcos, CA (US)

(72) Inventor: Curt Davidson, San Marcos, CA (US)

( * ) Notice: Subject to any disclaimer, the term of this patent is extended or adjusted under 35 U.S.C. 154(b) by 0 days.

(21) Appl. No.: 17/721,165

(22) Filed: Apr. 14, 2022

(51) Int. Cl.
*G06Q 30/00* (2023.01)
*G06Q 50/00* (2012.01)
*G06Q 30/0601* (2023.01)

(52) U.S. Cl.
CPC .......... *G06Q 50/01* (2013.01); *G06Q 30/0631* (2013.01); *G06Q 30/0641* (2013.01)

(58) Field of Classification Search
CPC . G06Q 50/01; G06Q 30/0631; G06Q 30/0641
USPC ................................. 705/26.1–27.2
See application file for complete search history.

(56) References Cited

U.S. PATENT DOCUMENTS

| | | | | |
|---|---|---|---|---|
| 2009/0171739 A1* | 7/2009 | De | ..................... | G06Q 30/0601 705/26.1 |
| 2013/0211951 A1* | 8/2013 | Kalinin | .............. | G06Q 30/0241 705/26.7 |

OTHER PUBLICATIONS

Yakhchi, Shahpar, "Learning Complex Users' Preferences for Recommender Systems", https://doi.org/10.48550/arXiv.2107.01529 (Year: 2021).*

* cited by examiner

*Primary Examiner* — Anand Loharikar
(74) *Attorney, Agent, or Firm* — James A. Italia; Italia IP

(57) ABSTRACT

The disclosure features a method which includes receiving, through one or more graphical user interface(s) (GUI(s)), input including one or more gift contact information chosen from information including name, email address, mailing address, age, gender, and personality of the gift contact, and one or more categories and subcategories of interests of the gift contact, determining, through one or more processor(s), one or more gift suggestion(s) for the gift contact based on the received gift contact information and/or categories and subcategories, and outputting the one or more gift suggestion(s). Also featured are one or more non-transitory, computer-readable storage media having instructions for performing the method, and a computer or computer system capable of performing the method.

13 Claims, 12 Drawing Sheets

GIFTING APPLICATION

FIELD

The present disclosure is directed to the field of electronic commerce. More particularly, the disclosure relates to a gifting application and/or website for facilitating gift giving to one or more gift contacts.

BACKGROUND

Electronic commerce websites have been around since the dawn of the Internet, and have allowed purchasing and sending gifts through a personal computer. However, the general functionalities and formats of these web sites has not changed much, and don't provide many options for a user of the websites to keep on top of sending gifts to all the people in their life.

SUMMARY

In general, in a first aspect, the disclosure features a method. The method includes receiving, through one or more graphical user interface(s) (GUI(s)), input including one or more gift contact information chosen from information including name, email address, mailing address, age, gender, and personality of the gift contact, and one or more categories and subcategories of interests of the gift contact, determining, through one or more processor(s), one or more gift suggestion(s) for the gift contact based on the received gift contact information and/or categories and subcategories, and outputting the one or more gift suggestion(s).

In general, in a second aspect, the disclosure features one or more non-transitory, computer-readable storage media. The non-transitory, computer-readable storage media has instructions for execution by one or more processor(s), the instructions programmed to cause the one or more processor(s) to receive, through one or more graphical user interface(s) (GUI(s)), input including one or more gift contact information chosen from information including name, email address, mailing address, age, gender, and personality of the gift contact, and one or more categories and subcategories of interests of the gift contact, determine, through the one or more processor(s), one or more gift suggestion(s) for the gift contact based on the received gift contact information and/or categories and subcategories, and output the one or more gift suggestion(s).

In general, in a third aspect, the disclosure features a computer or computer system. The computer or computer system includes one or more processor(s) designed to execute instructions, and one or more non-transitory, computer-readable memories storing program instructions for execution by the one or more processor(s). The program instructions are programmed to cause the one or more processor(s) to receive, through one or more graphical user interface(s) (GUI(s)), input including one or more gift contact information chosen from information including name, email address, mailing address, age, gender, and personality of the gift contact, and one or more categories and subcategories of interests of the gift contact, determine, through the one or more processor(s), one or more gift suggestion(s) for the gift contact based on the received gift contact information and/or categories and subcategories, and output the one or more gift suggestion(s).

Features of the method, non-transitory, computer-readable storage media, and computer or computer system can include the following. The one or more categories and subcategories of interests of the gift contact can be solicited by displaying a questionnaire on the one or more graphical user interface(s). The questionnaire can generate a first question related to a broad category of interest of the gift contact, and then a second question related to a narrower subcategory of interest of the gift contact based on an answer received for the first question. The one or more gift suggestion(s) for the gift contact can be determined by keywords or tags corresponding to the one or more categories and subcategories of interests of the gift contact. The keyword or tags can be used in a search engine to determine the one or more gift suggestions(s) for the gift contact. The search engine can be hosted on and/or access content from one or more merchant website. The search engine can also access content from a database of gift suggestions. The one or more gift suggestions can be outputted on a graphical user interface (GUI) and/or email message, text message, or social media message accessible to a gift giver or sender or accessible to the gift contact. A range or limit of the price of the gift suggestions can be received as input, and the one or more gift suggestion(s) can be determined and outputted based on the range or limit. The one or more gift suggestions can include a debit card or a gift card. Input including one or more gift event information including occasion and/or date of the gift event can also be received by the one or more graphical user interface(s) (GUI(s)). One or more gift(s) for one or more gift event(s) for the gift contact can be purchased based on the one or more gift suggestion(s). The one or more gift(s) can be purchased automatically or by providing an option for purchasing the one or more gift(s). One or more reminders for purchasing one or more gift(s) for one or more gift event(s) can be set. The one or more reminders can be sent by way of an email message, a text message, or a social media message to the gift giver or sender or to the gift contact. One or more multimedia content including images, audio, and/or video corresponding to the gift event information can be sent to the gift contact. One or more confirmation message chosen from an email message, a text message, or a social media message confirming purchase and/or delivery of the one or more gift(s) can also be sent to the gift contact and/or gift giver or sender.

It should be understood that the method, non-transitory, computer-readable storage media, and computer or computer system are not to be considered limitations on the invention defined by the claims. The featured method, non-transitory, computer-readable storage media, and computer or computer system can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

DETAILED DESCRIPTION

Figure 1:
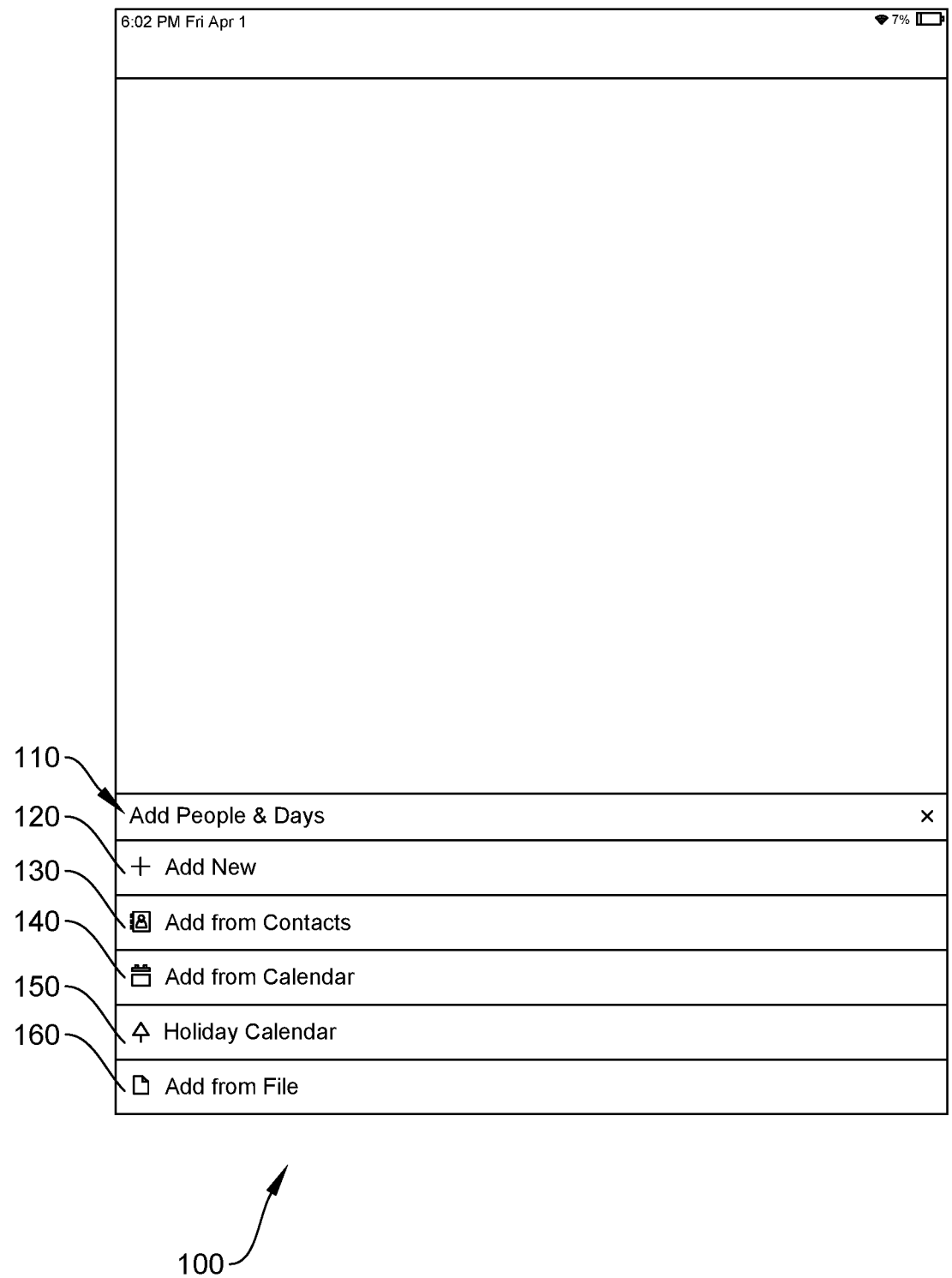
FIG. 1 is a representation of a graphical user interface (GUI) for entering a new gift contact according to one implementation.

Reference will now be made in detail to various illustrative implementations. It is to be understood that the following discussion of the implementations is not intended to be limiting.

The disclosure relates to methods implemented by way of an application (i.e., app), dedicated web site, or a combination of both that allows a user to never miss sending a gift to a loved one once they set up certain parameters. The methods allow a user, such as a gift giver or sender, to store and edit a variety of information with respect to gift recipients (i.e., gift contacts) and gift events, such as a birthday occasion, a holiday occasion, a thank you occasion, a congratulations occasion, a wedding occasion, an anniversary occasion, a seasonal occasion, and a baby occasion, which information the application or website subsequently uses to provide gift suggestions to a user or gift contact, choose a gift (automatically or manually), and send the gift (automatically or manually). A user can access the app or website and select an icon to enter a new gift contact that they want to track an event for. The user can enter the name of the gift contact and the date of the event. The user can optionally enter the birth year to keep track of the age of the gift contact or the gift contact's wedding year to keep track of anniversaries. An email address, cell phone number, and/or mailing address can be entered for sending a gift card (physical or electronic) or a physical gift, such as by conventional mail delivery service, such as the UNITED PARCEL SERVICE™ or the U.S. Postal Service. The application and/or website can provide a questionnaire about the gift contact, which solicits information such as gender, age, and interest (e.g., flowers, sports, toys, reading, cooking, gardening, music, computer gaming, movies). The questionnaire can be structured such that each broad interest category leads to another question to obtain more specific information as a subcategory of that category, and the answer to that question leads to another level of subcategory, and so on. For example, if the user is interested in sports, the questionnaire can drill down to more specific aspects of sports, such as Baseball>Equipment>Bats, Gloves, Balls, and so on. Similarly, if the user is interested in reading, the questionnaire can include several levels of more specific questions, such as Fiction/Non-Fiction>Genre/Subject>Author>Time Period. Similarly, if the user is interested in Fitness, the questionnaire can include follow up questions such as Type of Exercise>Weight Lifting>Equipment>Weights and Barbells. The questionnaire can also provide input for the gift contact's personality (e.g., goofy, conservative, adventurous), dollar value range for spending on gifts, or also provide an option for choosing if just a gift card/preloaded debit card of a certain value should be sent, which card could be personalized with the event and contact name. The questionnaire can also solicit input for the gift contact's favorite brands or merchants, which can be any merchant providing a product or service in physical or electronic form. The questionnaire can create sets of keywords or tags based on multiple characteristics of the gift contact that can match the user or gift contact with gift suggestions sourced internally within the app or website or sourced externally from merchant websites. Alternatively, or in addition to the questionnaire, information for the gift contact with respect to interests and gift events (e.g., birthdays, anniversaries) can be obtained from one or more social network account of the gift contact or by sending emails, texts (SMS), or social media messages to friends and family of the gift contact which solicit this information.

Additional features of the application and/or website include the following. The application and/or website can include parameters related to the gift contact or gift event that can be edited by the user. The application or website can allow user access by way of a subscription (e.g., weekly, monthly, annual). The application and/or website can be configured to send reminders to the user or the gift contact such as emails, text messages, or social media messages ahead of the gift event, such as a few days, weeks, or months in advance of the upcoming gift event (e.g., birthday, anniversary, graduation, secretary day) as well as provide gift suggestions tailored to fit the profile of the gift contact or allow the user or gift contact to select or browse gifts by linking to external online merchant websites (e.g., Amazon, Walmart, Dicks). The application and/or website can be configured to allow a user or gift contact to purchase gifts and/or gift cards through a payment gateway API (e.g., PayPal®, Google Pay) for scheduled delivery to the gift contact. Further, some implementations add the gift contact and gift scheduling functionalities to external merchant applications or websites as a type of plugin to their existing applications or websites. The application and/or website can include an option to have the gift contact emailed, texted, or messaged directly in advance of the event indicating the celebratory event and the sender and allow the gift contact to either pick from selected gifts or independently pick their own gift within a budget provided. The application and/or website can allow the user full control or have some or all functions automated such that once the user inputs all the information associated with the gift contact and gift event, he or she can toggle on and off reminders, whether he or she wants gift suggestions emailed, texted, or messaged to the user or gift contact or allow the application and/or website to run automatically to purchase and send gifts. For example, even if the user sets the application and/or website to send a reminder or to select the gift from gift suggestions, if the user or gift contact does not respond to the reminder, the application and/or website can still send the gift based on the original entered parameters. Other features can include an email, text message, or social media message confirmation sent to the user or gift contact when the gift is sent, which can include information such as what the gift is, the price, tracking information, and email or text confirmation when the gift is delivered. The gift contact can also be sent an email, text, or social media message with a celebratory note on the date of the gift event to let them know a gift has either been delivered or is on its way from the user. The email, text, or social media message sent to the gift contact can include multimedia content, such as images, audio, and/or video, which convey a congratulating or celebrating message to the gift contact. In the same email, text, or social media message or a follow up email, text, or social message, the gift contact can be provided the opportunity to respond to the user to thank the user for the gift. The gift contact and/or gift sender can also be provided an opportunity to announce the gift event and/or delivery of the gift via social media (e.g., FACEBOOK™, INSTAGRAM™, TWITTER™, PINTEREST™, YOUTUBE™, GOOGLE™), through a connecting network API or JavaScript SDK. The application and/or website can be accessible through a login page requiring input of credentials (e.g., username, password, pin, and/or two-factor or multi-factor authentication) from a user or users of the application and/or website.

The following figures depict different implementations of a graphical user interface (GUI) of the application and/or website capable of performing the method implementations described herein. The graphical user interface (GUI) will be described with respect to specific icons, fields, and other features which are displayed on a screen or display of a computer or computing device and are selectable by a user of the application and/or website by way of a mouse, touchscreen, or other input device such as a pen or stylus and provide for input. Selection of the icons and other features by a user activates certain method steps for performing various functions executable as computer program instructions on a stationary computer or portable computer/computing device. These computer program instructions may be provided to one or more processor(s) of a general-purpose computer, special purpose computer, or other programmable data processing device or combination of devices, such that the instructions, which execute via the processor or processors of the computer or other programmable data processing device(s), create means for implementing the method steps. As such, methods described herein can be performed as a series of steps which are implemented as computer-readable code, computer-readable instructions, computer-executable instructions, or "software" performed by one or more processor(s). Such software can be loaded onto a memory or memories of a computer, portable computer/computing device, or system or combination thereof, as an application or program (or multiple applications and/or programs) capable of performing one or more steps of the method implementations. As can be appreciated, different steps or groups of steps of the method implementations can be performed by different computers or computing devices, or some or all can be performed by a single computer or computing device.

FIG. 1 shows a graphical user interface (GUI) 100 for entering information for a contact for sending a new gift and a target date for sending the gift. The graphical user interface (GUI) includes a section 110 for adding information for the contact and the particular date. The section includes icons for adding a new contact manually 120, where selection or activation of the icon opens an input field for typing in the contact information, or for adding from a list of contacts 130, such as contacts stored on a computer or portable computer/computing device (e.g., mobile phone), where selection or activation of the icon allows a user to scroll through the list of stored contacts and select a name from the list. The section also includes icons for entering a date, such as adding from a general calendar 140 or a specific calendar such as a holiday calendar 150, where selection or activation of the icons pull up a calendar viewable by week, month, or year. The section also includes an icon for importing contact information and/or dates stored in a separate file 160. The file can be a text file formatted for storing information, such as a tab-delimited text file.

Figure 2:
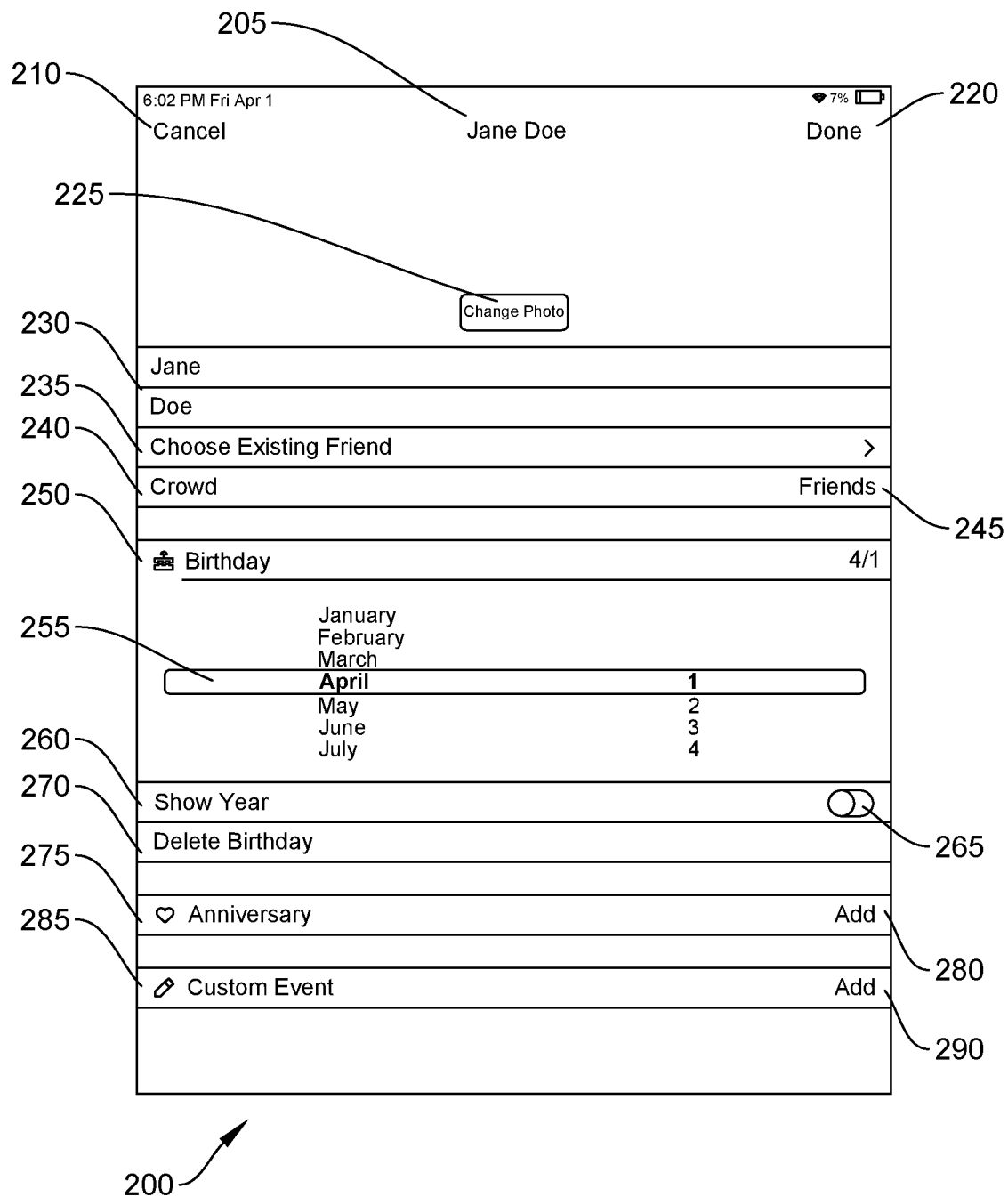
FIG. 2 is a representation of a graphical user interface (GUI) for entering name, contact information, gift event, and date according to one implementation.
Figure 3:
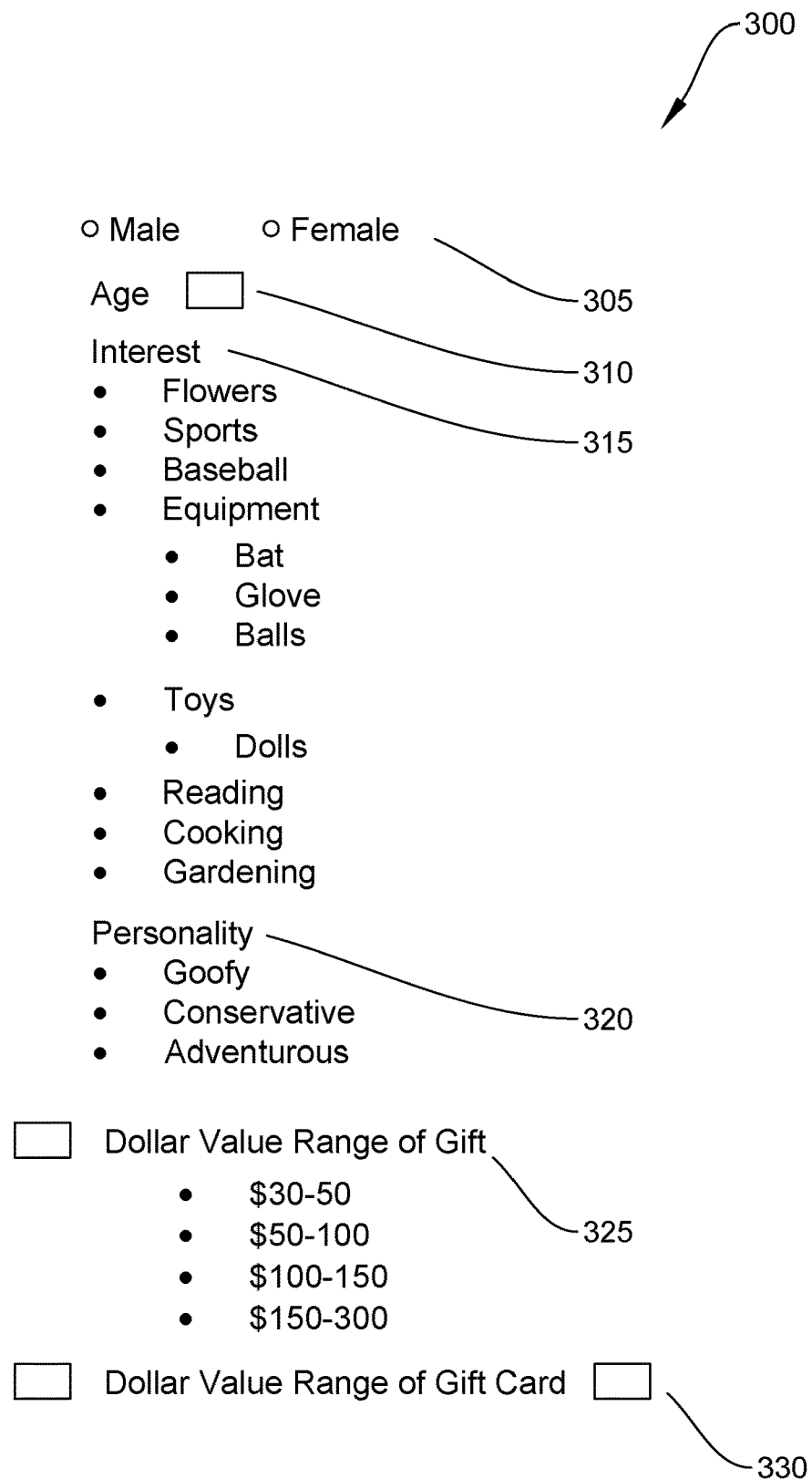
FIG. 3 is a representation of a graphical user interface (GUI) for displaying a questionnaire according to one implementation.

FIG. 2 shows a graphical user interface (GUI) 200 for adding a name of a gift contact, and an event and date associated with the gift. The graphical user interface (GUI) 200 has a name headline 205 designating the particular gift contact person associated with the information on the GUI 200. The GUI 200 includes utility functions such as a cancel icon 210 to abort saving the information or a finished icon 220 to complete saving the information. The GUI includes an icon 225 providing an option for uploading or changing a photo associated with the gift contact. The GUI also includes input fields for entering the name of the contact 230, type of contact 235 (e.g., friend, coworker), or other contact information 240 chosen from a specific list of contacts 245. The GUI 200 also includes fields for choosing the type of event 250 and the date of the event 255, with an option 260 for showing or hiding the year of the event, which is activated through a toggle switch 265. The GUI also includes an option for deleting the event 270, or adding other types of events 275 (e.g., graduation) or creating a custom event 285 through manual input, the latter of which is implemented through icons 280, 290 allowing such addition. The graphical user interface (GUI) 200 also includes an option for generating a questionnaire page for entering gift contact information, as is shown in FIG. 3. The questionnaire GUI 300 includes input fields for various characteristics such as gender 305, age 310, as well as fields that allow input of a list of interests 315 and the personality 320 of the gift contact. The questionnaire also includes a section 325 for selecting a dollar value range of a gift, and/or section 330 for entering a dollar value of a gift card. The questionnaire GUI 300 can include a hierarchical list of questions or categories that can be used to input more specific information on hobbies, interests, and personality features of the gift contact. Each answer or choice provided in the questionnaire by the user can generate a more specific question related to subcategories of the hobbies, interests, and personality features. In this way, the questionnaire can branch into multiple levels of subcategories descending from each question or category, based on the answers or choices of the user. As will be shown, the answers or choices determine keywords or tags that can be inputted into search engines and/or databases and retrieve gift suggestions for the user or the gift contact.

Figure 4:
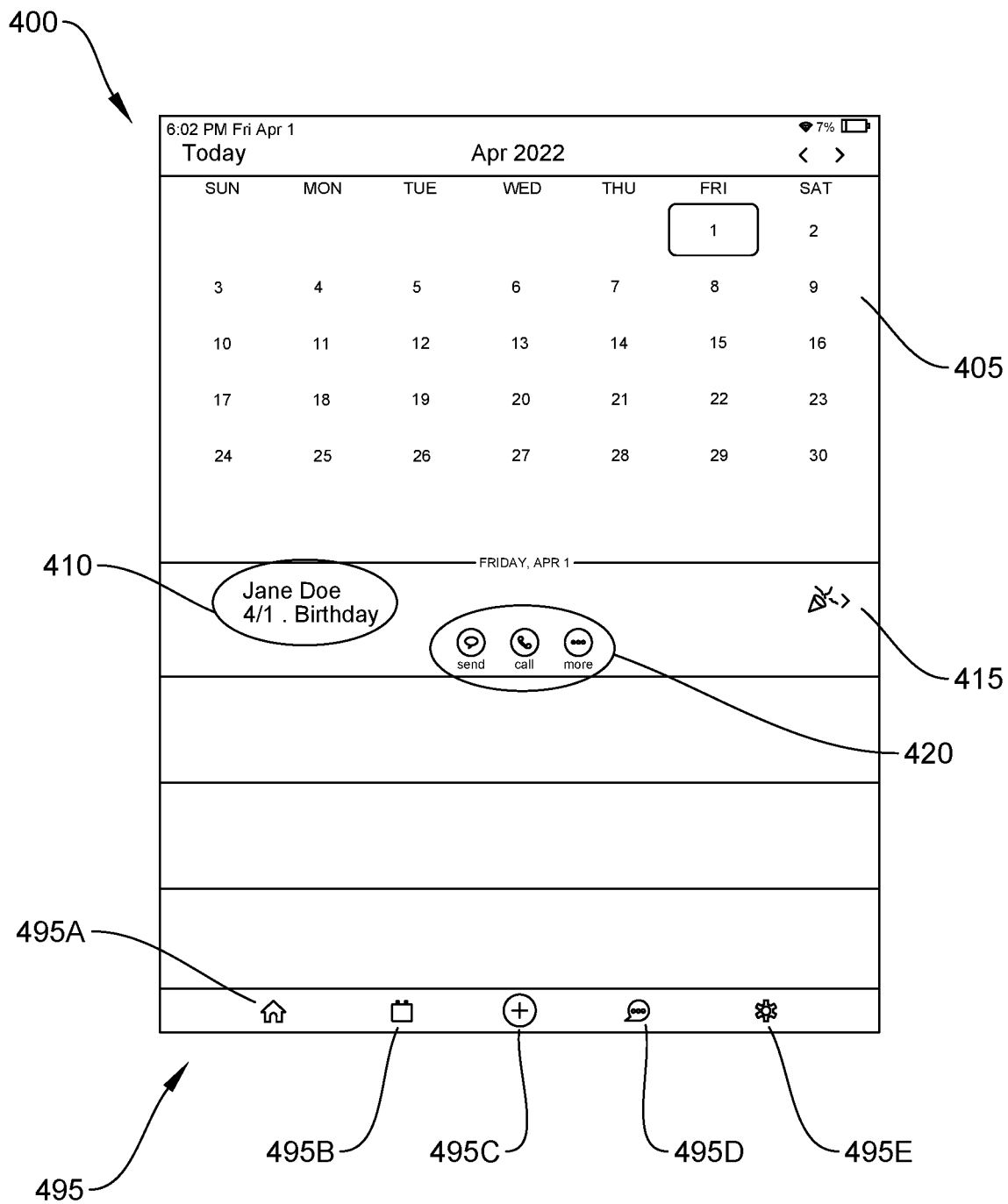
FIG. 4 is a representation of a graphical user interface (GUI) for displaying a calendar view according to one implementation.

FIG. 4 shows a graphical user interface (GUI) 400 for displaying a calendar view that allows a user to create a gift "appointment" with a specific date or dates for delivery of the gift. The GUI 400 includes a calendar 405 that highlights the gift appointment date. Displayed next to the calendar 405 are the name of the recipient and the gift occasion 410, as well as an icon 415 that when selected allows editing the information. The GUI 400 also includes additional icons 420 that provide functionalities such as sending the gift or calling the recipient. Clicking the more icon shown at 420 also displays an additional graphical user interface (GUI), shown in FIG. 5. The calendar view GUI 400 includes a tool bar 495 that includes icons for options/functions such a selecting the home page 495A, calendar view 495B, adding a new gift contact 495C, choosing a gift 495D, or changing settings 495E.

Figure 5:
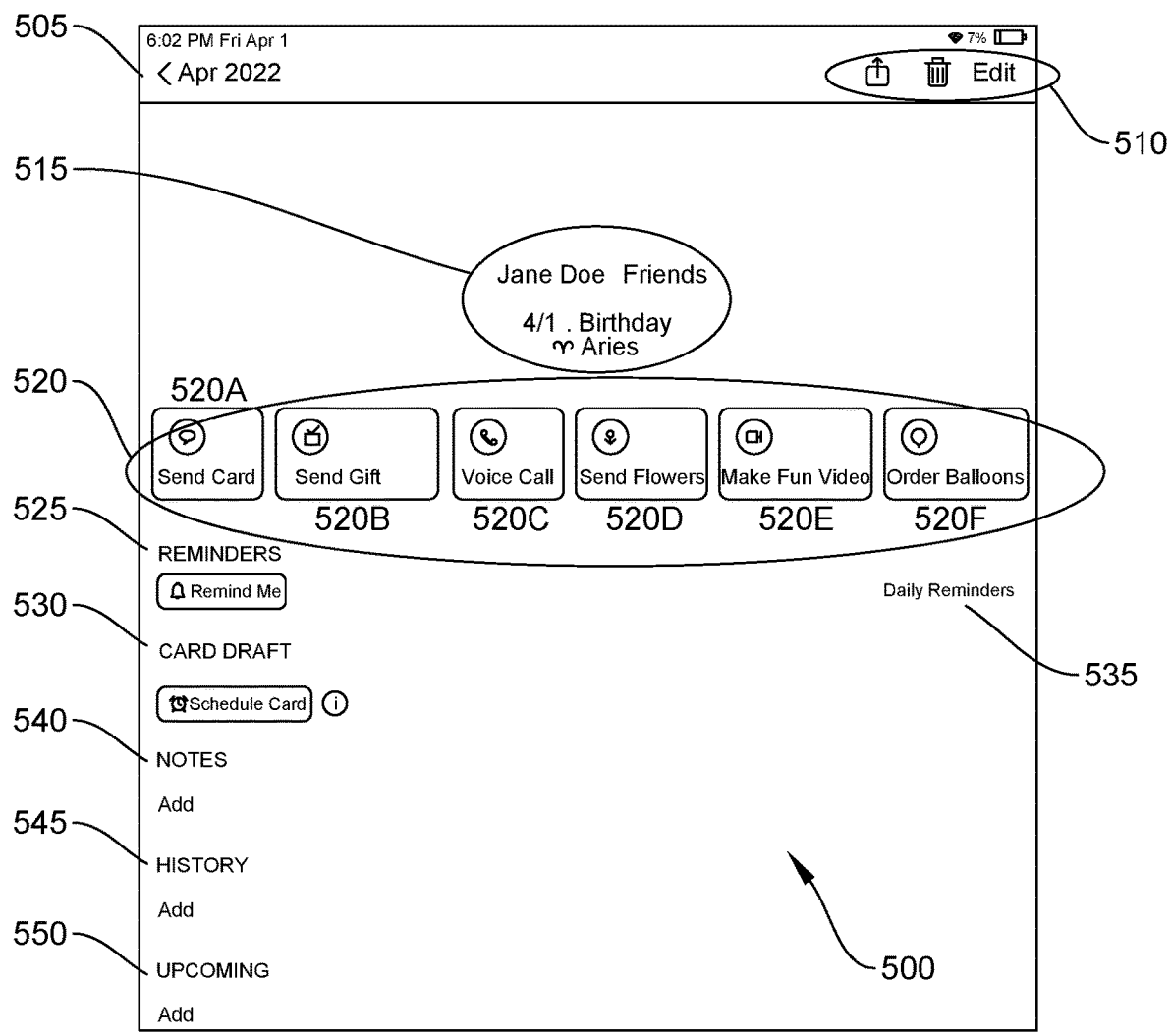
FIG. 5 is a representation of a graphical user interface (GUI) for sending or scheduling a gift or gift card according to one implementation.
Figure 6:
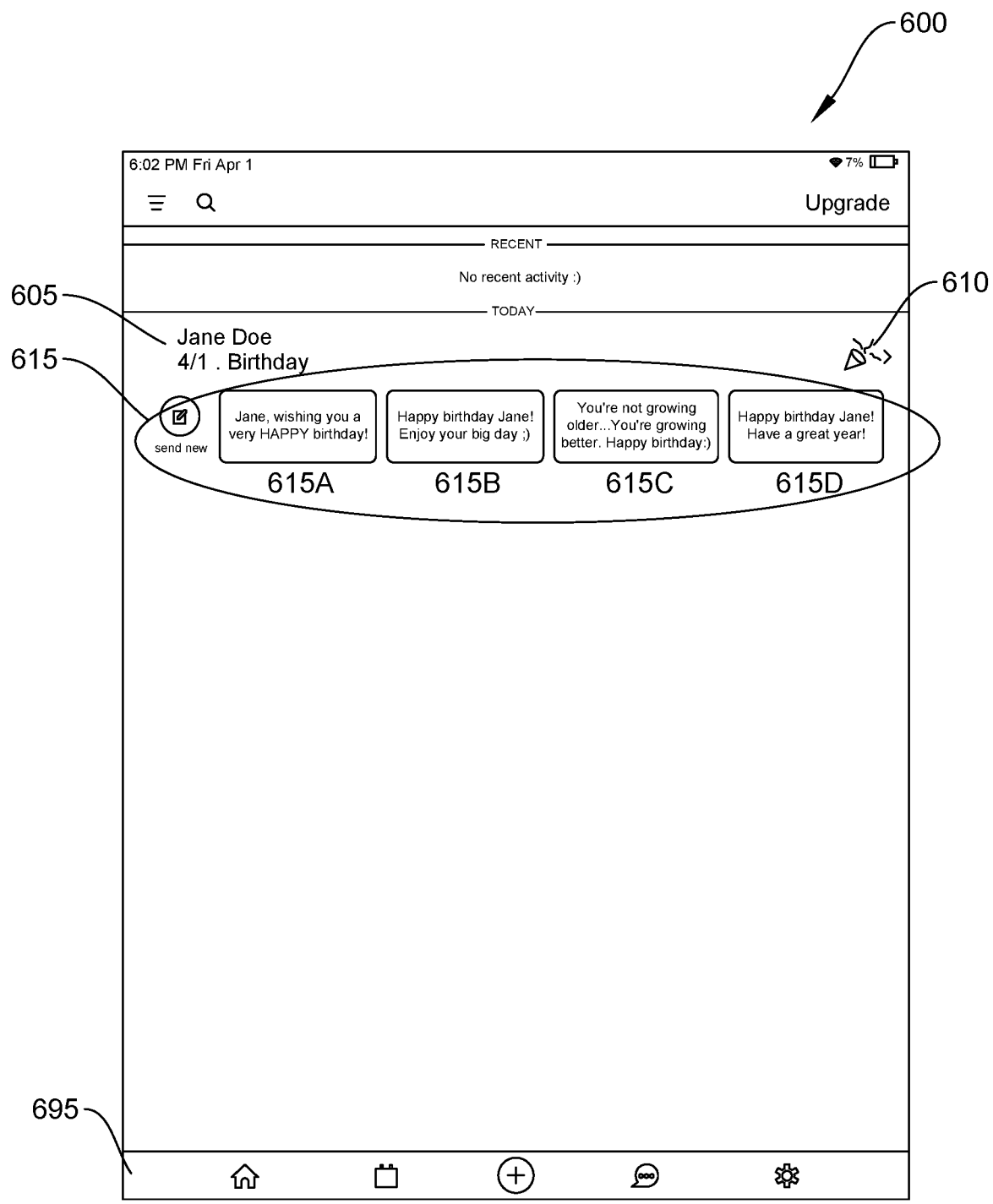
FIG. 6 is a representation of a graphical user interface (GUI) for choosing a message to send with the gift or gift card according to one implementation.
Figure 7:
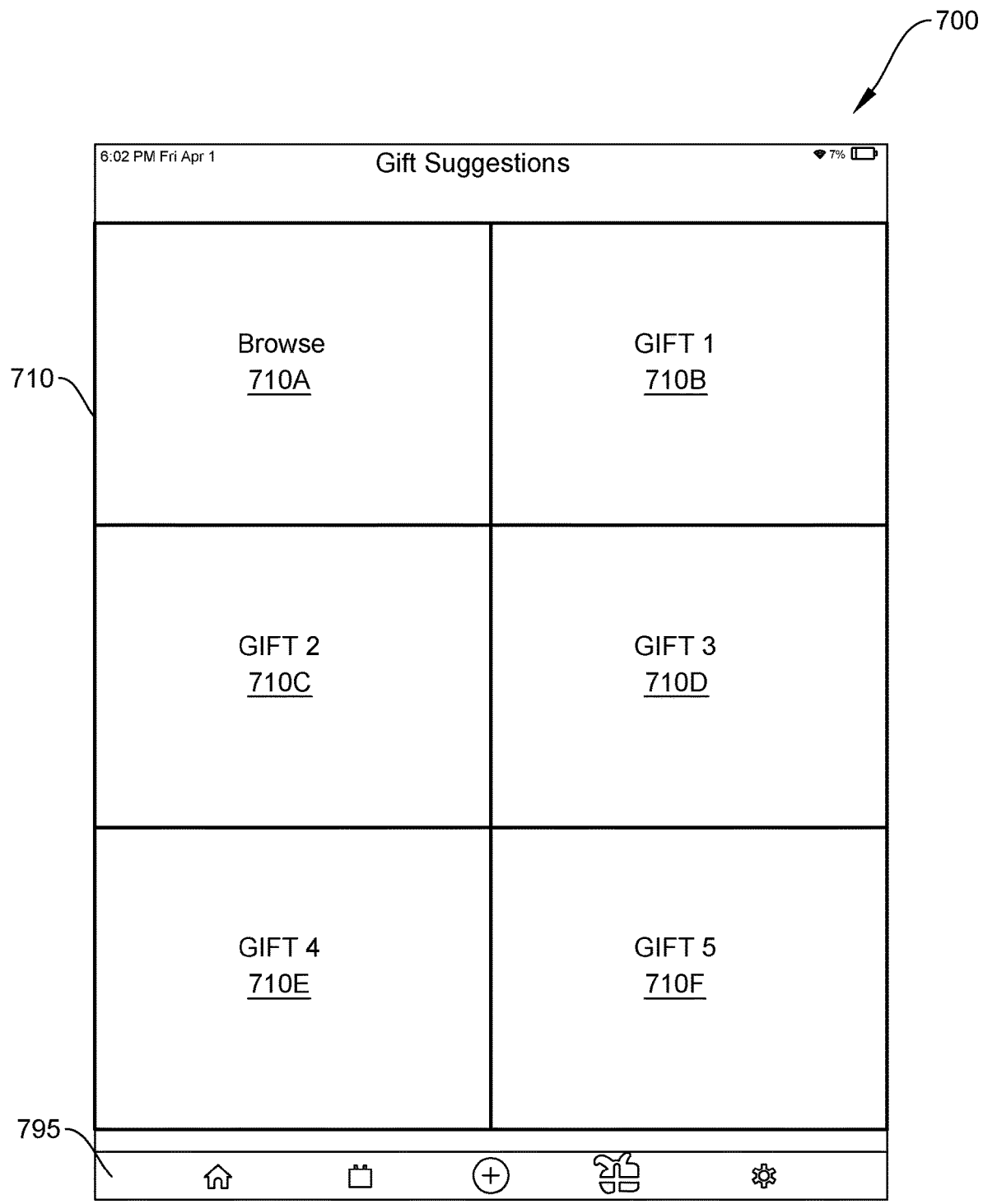
FIG. 7 is a representation of a graphical user interface (GUI) for displaying gift suggestions according to one implementation.

FIG. 5 shows a graphical user interface (GUI) 500 that provides for additional commands for scheduling and managing gifts and gift contact information. Alternatively, the GUI 500 can represent the content of an email message, text message, or social media message sent from the application and/or website to the user. The GUI or message 500 includes a date 505 displayed on the GUI which shows the current month and year, as well as tools 510 for navigating to the previous GUI and deleting or editing gift contact information. The GUI or message 500 includes gift contact information 515 for the particular contact such as name, type of contact, date of event, and type of event. The GUI or message 500 includes command icons 520 which allow the user to send various gifts 520A, 520B, 520D, 520F, or perform other functions 520C, 520E. Additional icons allow for setting of reminders 525 and scheduling a card 530. Additional portions on the GUI or message allow for adding of notes 540 and history 545 for the particular gift contact, or adding upcoming events 550. FIG. 6 shows a graphical user interface (GUI) or message content 600 that allows the user to choose a specific message to send with the gift. The GUI or message 600 includes basic gift contact information 605, a gift utility icon 610 which allows the user to add or edit the gift sent to the gift contact, and a menu 615 which displays different message options 615A-615D that can be chosen by the user to accompany the gift sent to the gift contact. Shown at the bottom of the GUI or message 600 is the tool bar 695 (also shown in FIG. 4). FIG. 7 shows an additional graphical user interface (GUI) or message 700 which provides the user or gift contact gift suggestions 710. The gift suggestions can be based on a combination of keywords or tags determined from the questionnaire GUI 300 shown in FIG. 3. The gift suggestions 710 can include a feature 710A which allows a user or gift contact to browse gifts from a merchant website (such as Amazon). The feature 710A may access and/or display all or a portion of a website of a merchant for facilitating purchase of a product or service from the merchant for the gift contact. Additionally, up to five gift suggestions 710B-710F can be retrieved from a database or generated, or can be obtained externally through hyperlinks to products or services from merchant websites. For example, a gift contact associated with questionnaire answers or categorical choices including female (gender), exercise (hobby), running (type), clothing (equipment) would have gift suggestions for apparel by manufacturers such as Lululemon presented to either the user or the gift contact. This would be based on the combination of keywords or tags (female, exercise, running, clothing) which resulted from the answers in the questionnaire. The gift suggestion apparel could be further determined by questionnaire answers or categorical choices indicating such factors as favorite color, style, and price range. Another gift contact whose associated questionnaire answers or categorical choices includes outdoors (hobby), fishing (type), tackle (equipment) would have gift suggestions from merchant websites such as Cabela's, based on that combination of keywords or tags. The questionnaire and its associated gift suggestions need not be limited to traditional gifts; other types of gifts or gift cards, such as food and drink or travel can also be solicited or suggested. Indeed, the gift suggestions can be for any product or service in physical form or electronic form. As such, the gift suggestions 710B-710F match input provided for each gift contact based on answers or choices provided in the hierarchical questionnaire of interests 300. The answers or choices from the hierarchical questionnaire provide keywords or tags that can be inputted into an interface with one or more external merchant website search engines, or can be used to search an internal database of gift suggestions by way of SQL commands. In other implementations, the gift suggestions can be based upon more general information instead of interests, such as demographic information including gender, age, geographic location, and occupation. The tool bar 795, also shown in FIG. 4 and FIG. 6, is shown at the bottom of FIG. 7. Gifts and gift cards, when selected for delivery to the gift contact, can be accompanied by occasion-appropriate greeting cards, wrapping, imagery, audio, video, or packaging.

Figure 8:
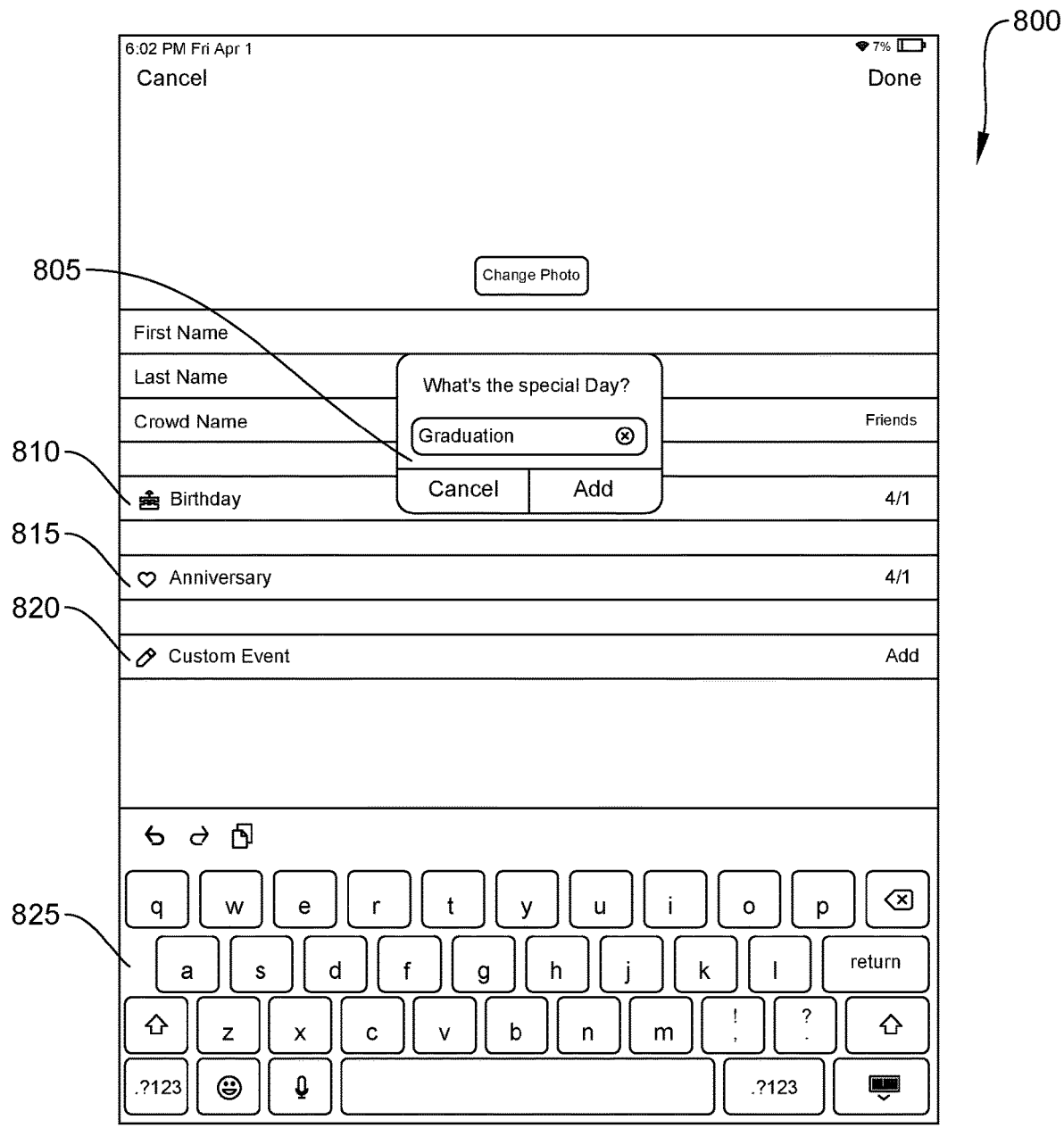
FIG. 8 is a representation of a graphical user interface (GUI) for adding a gift event according to one implementation.

FIG. 8 shows a graphical user interface (GUI) 800 for adding a gift occasion/event. The GUI 800 includes an input field 805 for adding the gift occasion based on selection of icons for adding a birthday 810, anniversary 815, or a custom event 820. A condensed keyboard 825 allows the user to manually type in the event.

Figure 9:
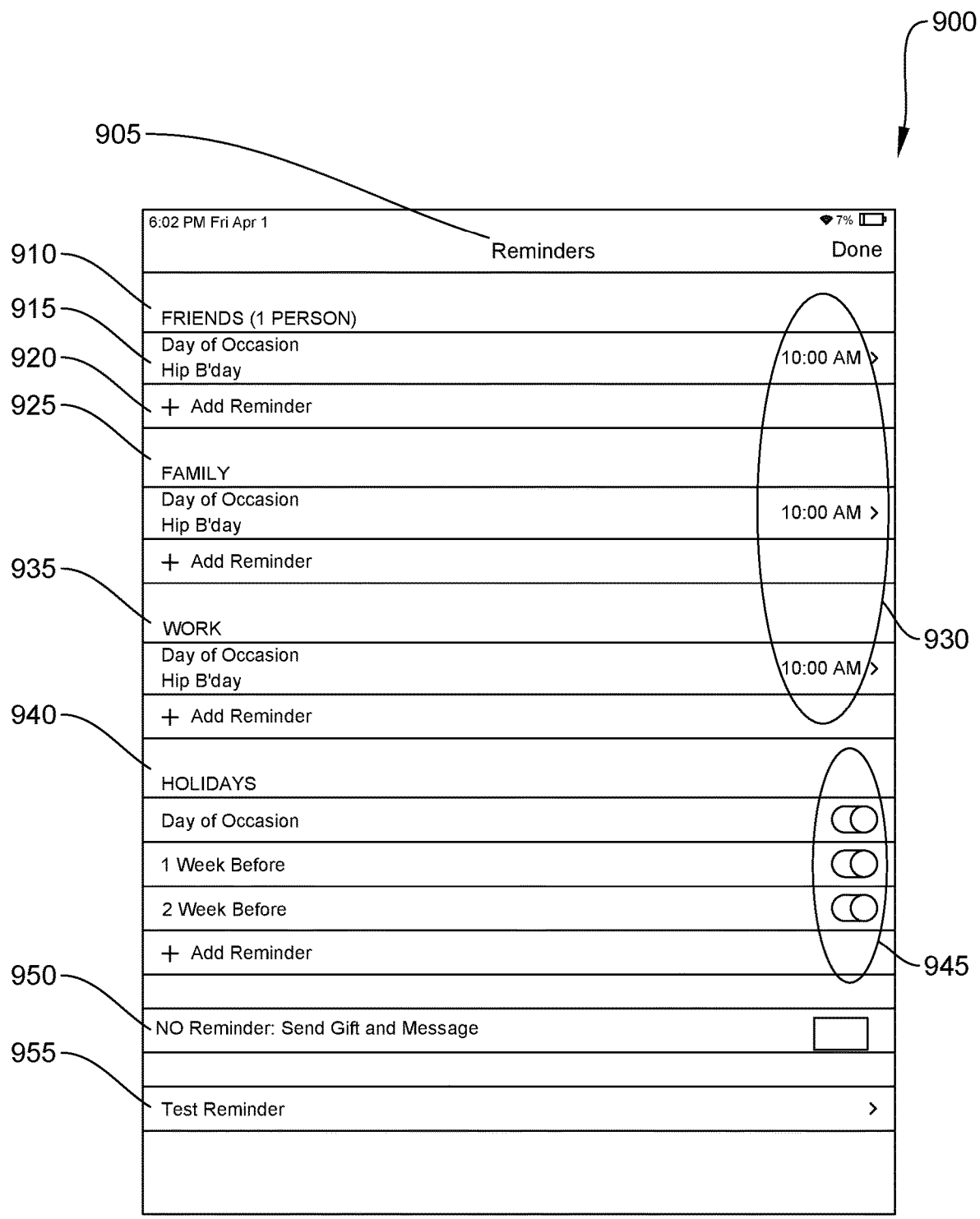
FIG. 9 is a representation of a graphical user interface (GUI) for scheduling one or more reminders according to one implementation.

FIG. 9 shows a graphical user interface (GUI) 900 for scheduling reminders 905. The reminders can include separate fields for scheduling reminders for friends 910, family 925, and work 935. Below each field, the day of the occasion 915 can be selected, and below that an icon 920 adds the reminder when selected. In addition to the day of occasion, a time 930 can be chosen for scheduling the reminder at a specific time of day. The graphical user interface (GUI) 900 includes a field for reminders for holidays 940 and toggle switches 945 which allow the user to turn on and off reminders for various time periods before or on the particular holiday. An option for choosing no reminder 950 which allows the user to send the gift and message is also shown, as well as an option to test reminders 955.

Figure 10:
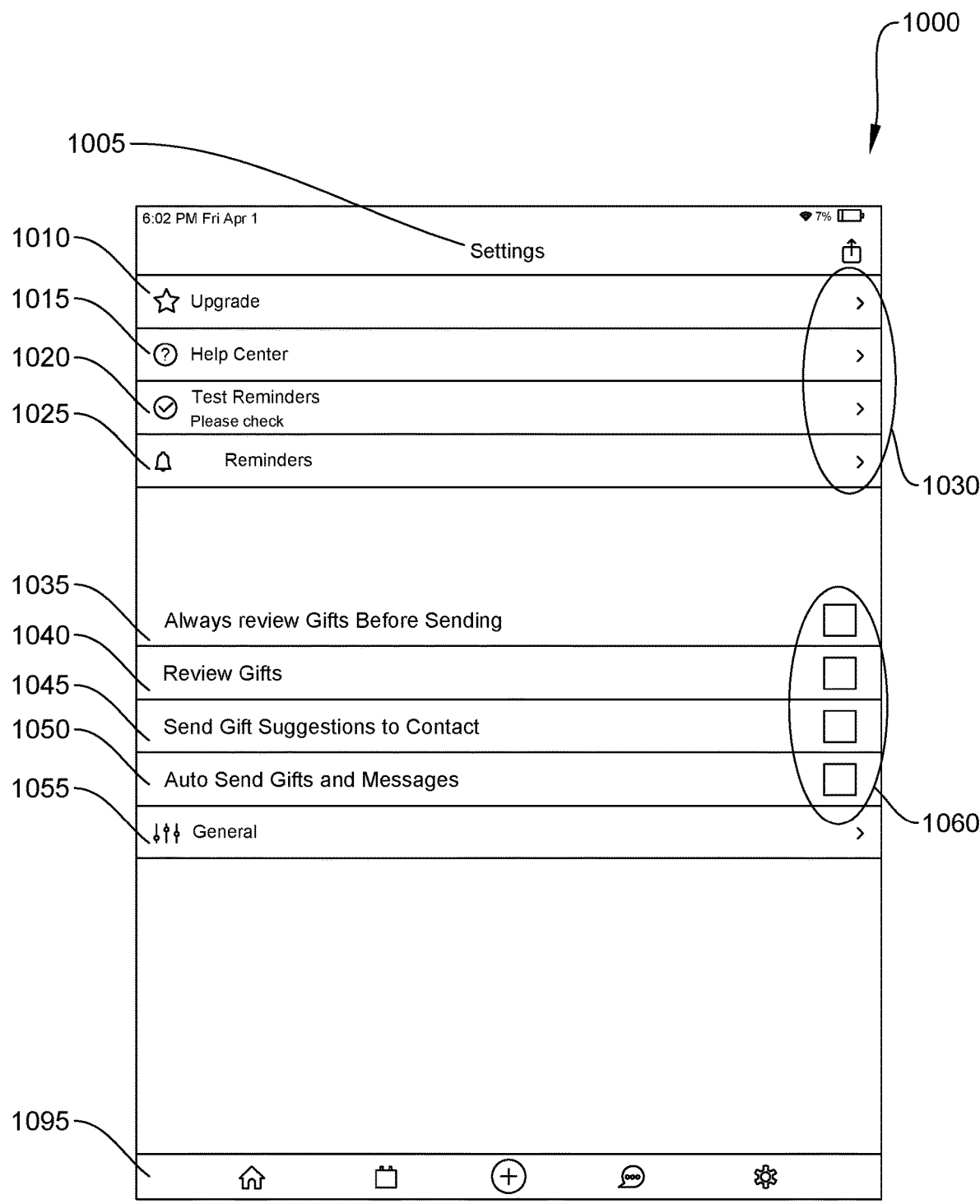
FIG. 10 is a representation of a graphical user interface (GUI) for setting parameters for the user or gift contact with respect to a level of interaction for reviewing gifts or gift suggestions to select from according to one implementation.

FIG. 10 shows a graphical user interface (GUI) 1000 which provides parameters to a user regarding the level of interaction they want for the user or gift contact with respect to reviewing gifts to select from, or allowing the application to choose gifts for the user or gift contact. The graphical user interface (GUI) displays a list of settings 1005 available including those for upgrading 1010 (allows a user to download the latest version of the application), a help center 1015 (directs a user to a menu of Frequently Asked Questions and other source of instructions of the user), and settings to test reminders 1020, and schedule reminders 1025. Arrows 1030 for each of the settings expand to display the user parameters when selected. Additional settings allow a user to select options such as reviewing gifts before sending 1035, reviewing gifts generally 1040, sending gift suggestions to gift contacts 1045, and automatically sending gifts and messages 1050; these options are selected by clicking on check boxes 1060 to the right of each option. The GUI 1000 also provides an option for choosing general settings 1055, such as user account or login information. The tool bar 1095 is shown at the bottom of the GUI 1000.

Figure 11:
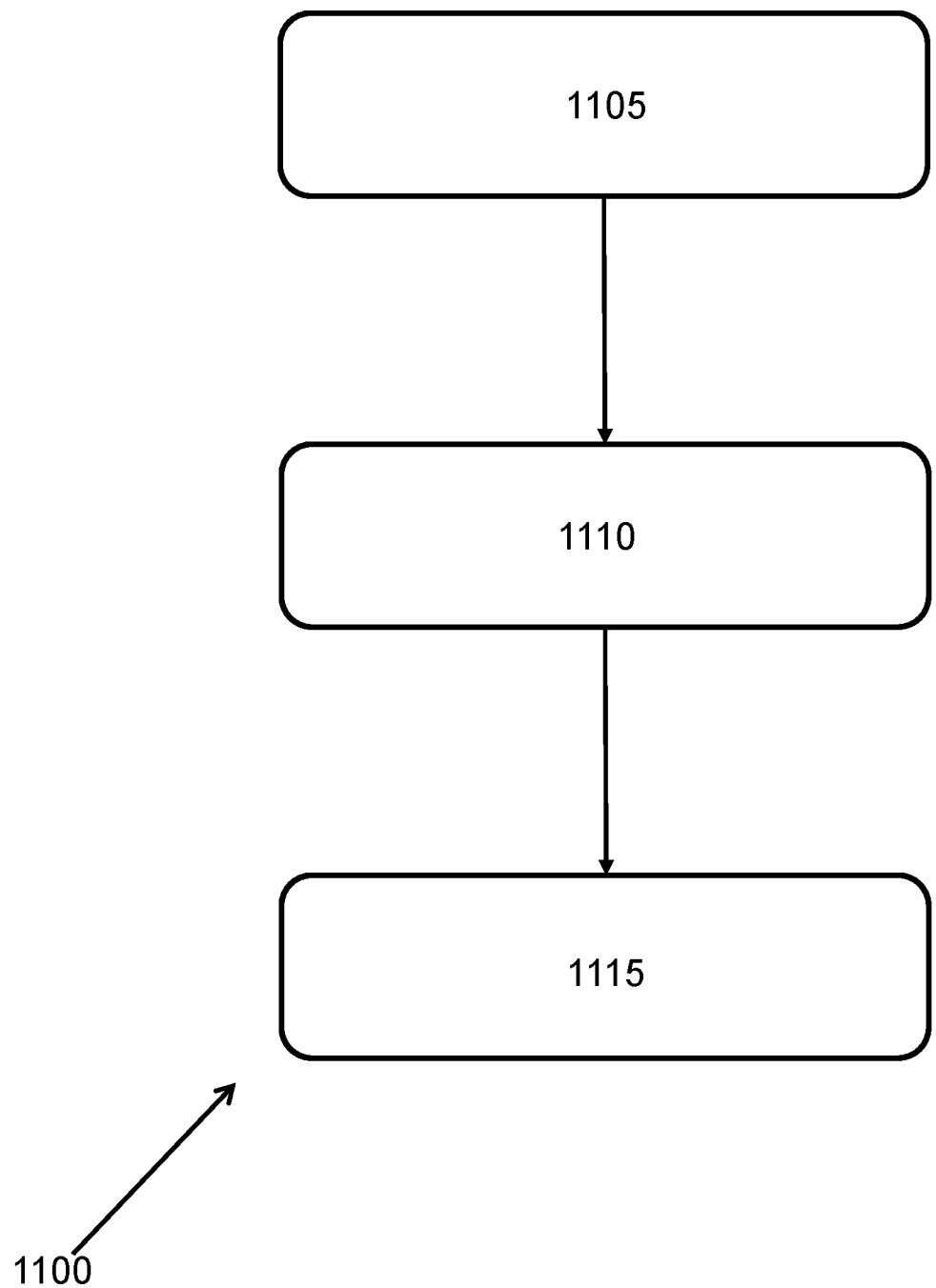
FIG. 11 is a schematic diagram depicting a method according to one implementation.
Figure 12:
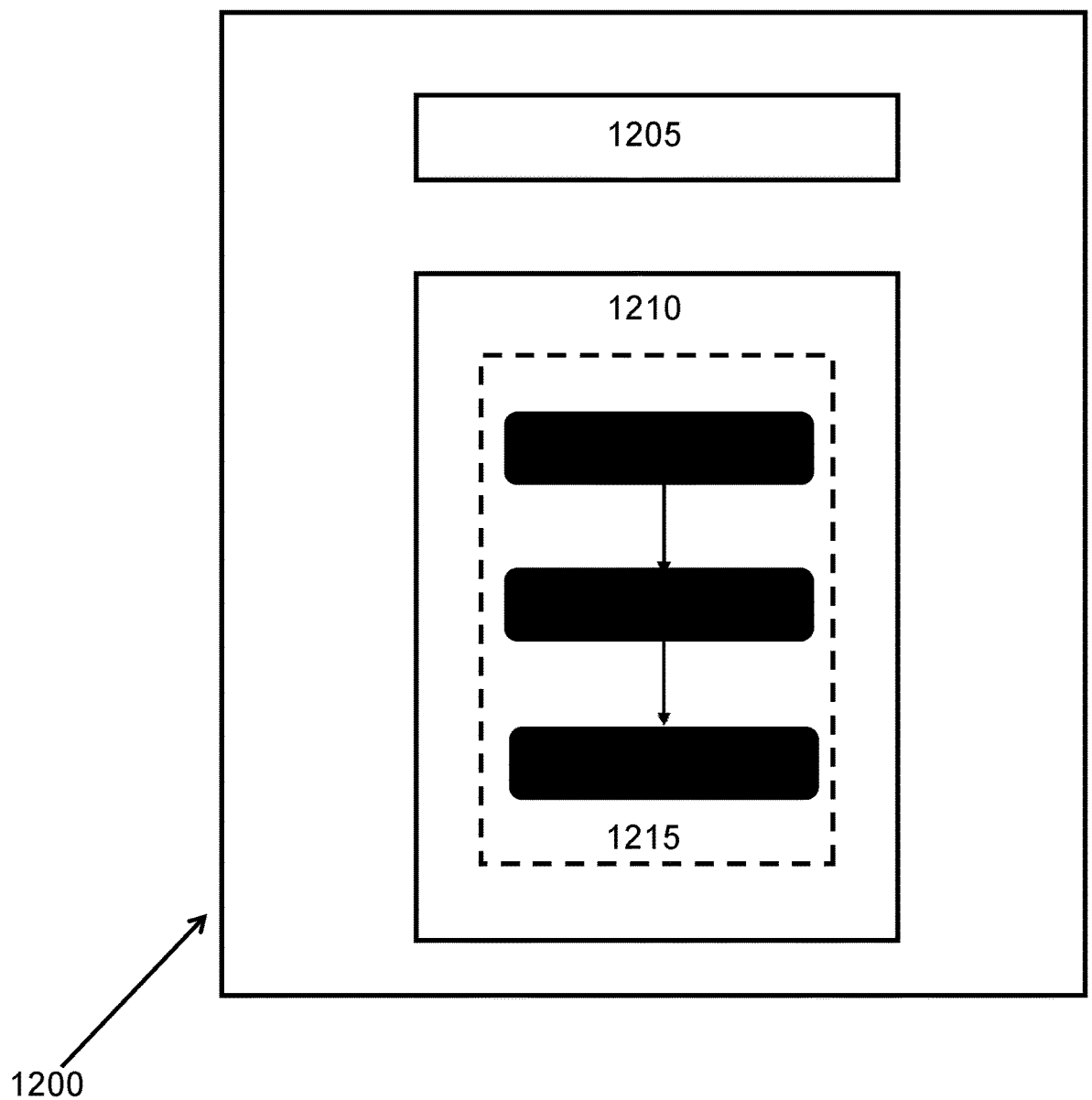
FIG. 12 is a schematic diagram depicting a computer or computer system according to one implementation.

FIG. 11 depicts a method 1100 that can be implemented by way of an application and/or dedicated website displaying one or more of the graphical user interfaces(s) of FIGS. 1-10. Interaction of a user with the one or more graphical user interface(s) can cause instructions performable by one or more processor(s) to execute one or more step(s) of the method 1100. The instructions can be stored on a non-transitory computer readable storage medium or media on a computer or computer system that also has one or more processor(s) designed to execute instructions. In one implementation, the method 1100 includes receiving 1105, through one or more graphical user interface(s) (GUI(s)), one or more gift contact information chosen from information including name, email address, mailing address, age, gender, and personality of the gift contact, and one or more categories and subcategories of interests of the gift contact, determining 1110, through the one or more processor(s), one or more gift suggestion(s) for the gift contact based on the received gift contact information and/or categories and subcategories, and outputting 1115 the one or more gift suggestion(s). FIG. 12 depicts a computer or computer system 1200 having one or more processor(s) 1205 designed to execute instructions, and one or more non-transitory, computer-readable memories 1210 storing program instructions 1215 for execution by the one or more processor(s), the instructions programmed to cause the one or more processor(s) to perform the method depicted in FIG. 11.

As can be appreciated by those in the computer engineering arts, inputting steps depicted in the figures, such as inputting gift contact, gift event, and/or gift scheduling information, can be performed through one or more input-output (I/O) interface on a fixed position computer such as a desktop computer or server or on a portable computer/computing device, such as a tablet, laptop, PDA, gaming device, or smartphone. Visual prompting can take the form of a message, input field, or icon, or a combination thereof, provided to the user on a display. The message, input field, or icon can be provided as part of a graphical user interface (GUI) provided on the display (e.g., computer monitor, screen) of a computer or computing device which provides one or more data entry fields, check boxes, lists, or pull-downs which allow the user to input information related to a gift contact, gift event, and/or gift scheduling. Auditory prompting can take the form of speech or a recording broadcast from a speaker which prompts the user to enter the information. Inputting steps can be performed through traditional inputting means such as a physical keyboard or a keyboard projected on a display, such as a touchscreen. The keyboard can be a QWERTY keyboard or a condensed keyboard commonly used in electronic devices such as cell phones. Inputting can also be performed through the user providing speech which is inputted through a microphone of the computer or computing device and recognized by speech recognition algorithms programmed on the computer or computing device. Outputting steps can be performed through a visual output device such as a display (e.g., screen, monitor) on the computer or computing device. Computer-executable code or instructions for performing the method steps can be implemented as software or an application capable of being run on the computer(s) or computing device(s). The computer-executable code or instructions can be installed on the computer(s) or computing device(s) during manufacture as software, or implemented as firmware or hardware (e.g., circuitry), or some combination of these. The computer-executable code or instructions can be configured to be downloadable onto the memory or memories of the computer(s) or computing device(s) from a cloud storage source available on the Internet, such as an application retail source (e.g., "app store") capable of being accessed from a mobile phone, tablet, desktop computer, or other programmable device having components or features capable of performing the method steps. Examples of suitable Internet-accessible sources include the Apple Store, Google Play, and other sites that make software applications and other downloads available for purchase or license.

The computer-executable code or instructions can also be hosted on a server or servers accessible to users through a network connection, such as a web page accessible through a web browser and hosted on a web server, or can be distributed between a server and an application installed on a user's device. The computer-readable code, computer-readable instructions, computer-executable instructions, or "software" can be organized into routines, subroutines, procedures, objects, methods, functions, or any other organization of computer-executable instructions that is known or becomes known to a skilled artisan in light of this disclosure, and can be programmed in any suitable programming language, including PHP, HTML, XML, XHTML, JavaScript, C, C#, C++, Java, Python, Perl, Ruby, Swift, Visual Basic, and Objective C. By such programming, the computer-readable code, computer-readable instructions, computer-executable instructions, or "software" instruct one or more processors of the computer or computing device to carry out the operations and commands of the application. Inputted gift contact, gift event, and/or gift scheduling information can be stored in the computer or computing device's memory. The memory can be implemented through non-transitory computer-readable storage media such as RAM. As used in the context of this specification, a "non-transitory computer-readable storage medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM.

In one implementation, a computer system for performing the method steps includes 1) one or more computer(s) that are located remotely from a user and connected to the Internet and to each other and 2) a computer or computing device accessible to the user that is peripheral to the remote computer(s) and that can communicate with the remote computer(s) through a network. The remote computer(s) can include a fixed position computer, and the user's computer or computing device can be fixed such as a desktop computer or mobile/portable. The user's computer or device can be a desktop computer, laptop computer, tablet, gaming device, PDA or smartphone that can access or host the graphical user interfaces (GUIs) of FIGS. 1-10. The graphical user interfaces (GUIs) can be downloaded together as an application from cloud storage services providing retail application downloading to the user's computer or computing device for hosting on the user's computer or computing device, or can be hosted on a remote computer which acts as a web server and is accessed through the Internet through an Internet browser on the user's computer or computing device. The remote computer(s) can receive gift contact and/or gift event and/or gift scheduling information inputted by the user through the graphical user interfaces (GUIs) of FIGS. 1-10 (either provided as the application on the user's computer or device, or accessed through the web server) and can have a memory capable of housing storage of the gift contact information (such as information provided on the questionnaire GUI 300) and/or gift event and/or gift scheduling information. The gift contact and/or gift event and/or gift scheduling information can be stored in relational databases (e.g., Oracle, SQL Server) stored in memory that communicate by way of a database server or servers with the user's computer or computing device or other remote computers, such as one or more servers chosen from servers including social network servers, financial account servers, and merchant servers. The remote computer(s) can include a set of computer-executable instructions stored in memory which can be used to perform functions based on the stored information, such as sending reminders, providing gift suggestions, scheduling gifts, and sending gifts and messages. The remote computer(s) can be in communication with other computers through a network such as a financial account server that manages a financial account of the user (e.g., bank or credit card), social network server (e.g., Facebook), and a merchant server (e.g., Amazon) to provide for such functionalities as gift purchasing, gift scheduling, and gift announcements. The remote computer(s) can then communicate to the user's computer or computing device messages, notifications, and/or confirmations that the functions have been performed. In some implementations, one or more method steps or functions are performed by computer-executable instructions on the user's computer or computing device instead of remotely. In other implementations, the entire set of steps are performed on the user's computer or computing device. The method implementations need not be limited to one particular distribution of functions between those hosted on the user's computer or computer device and those hosted remotely; multiple configurations hosted on one or more computers are contemplated.

Additional embodiments include a computer, computing device, or system or combination thereof capable of carrying out the method implementations. The computer, computing device, system or combination thereof can include one or more processors capable of executing the computer-readable code, computer-readable instructions, computer-executable instructions, or "software", one or more interface capable of providing input or output, one or more databases and a set of instructions (e.g., software) stored in a memory or memories of the computer, computing device, or system or combination thereof for carrying out the method implementations. The computer, computing device, or system or combination thereof can include one or more stand-alone computer, such as a desktop computer, a portable computer, such as a tablet, laptop, gaming device, PDA, or smartphone, or a set of computers or devices connected through a network including a client-server configuration and one or more database servers. The network can use any suitable network protocol, including IP, UDP, or ICMP, and may be any suitable wired or wireless network including any local area network, wide area network, Internet network, intranet network, telecommunications network, Wi-Fi enabled network, or Bluetooth enabled network. Other protocols include Hypertext Transfer Protocol (HTTP), extensible markup language (XML), extensible hypertext markup language (XHTML), or a Wireless Application Protocol (WAP) protocol. In this way, one or more steps of the method implementations can be distributed across the system or combination, or performed on only one computer or computing device, according to specific applications or designs.

Computers, computing devices, or systems thereof described herein can include a variety of components known in the art, including one or more processor(s), a volatile memory, a non-volatile memory, standard I/O interfaces such as one or more interfaces including a universal serial bus (USB) port, an HDMI or HDMI ARC port, an optical port, an ethernet port, and/or a serial port, a hard drive, a disk drive, a CD-ROM drive, a motherboard, a printed circuit board (PCB), circuitry for enabling a wireless connection or communication to another device, such as a BLUETOOTH® board, a Wi-Fi board, or a transmitter-receiver for mobile telecommunications, a data bus, an address bus, a control bus, and/or one or more user interface devices including a display, keyboard, keypad, trackpad, mouse, control panel, touchscreen display, speaker, camera, and/or microphone. Portable computers/computing devices can include a GPS receiver. The computers, computing devices, or systems thereof can be equipped with an operating system implemented as software or firmware. As can be appreciated, the computers, computing devices, or systems may differ in their inclusion, exclusion, or configuration of components according to their individual applications or designs.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method, comprising:
instructing one or more processor(s) to display a hierarchical questionnaire of categories of information of a gift recipient on one or more graphical user interface(s) on a smartphone screen of a gift giver, the hierarchical questionnaire capable of branching into multiple levels of more specific subcategories of information based on answers received, wherein displaying the hierarchical questionnaire comprises:
    soliciting generic gift recipient hobby, interest, and personality information by:
        displaying categories of hobbies, interests, and personality features; and
        receiving as input from the gift giver one or more category selection from the displayed hobby, interest, and personality feature categories; and
    soliciting specific gift recipient hobby, interest, and personality information by:
        displaying multiple first subcategories of the hobby, interest, and personality feature category or categories selected by the gift giver;
        receiving as input from the gift giver one or more first subcategory selection from the displayed hobby, interest, and personality feature first subcategories; and
        displaying multiple second subcategories based upon the selection of first subcategories;
receiving as input, through the one or more graphical user interface(s) on the smartphone screen of the gift giver, additional gift recipient information comprising name, email address, mailing address, age, and gender;

sending the input received from the one or more graphical user interface(s) on the smartphone screen of the gift giver to one or more web server(s) by way of a network connection;

determining, through one or more processor(s) of the one or more web server(s), one or more gift suggestion(s) for the gift recipient based on the received gift recipient information and selected categories and subcategories of hobbies, interests, and personality features;

outputting the one or more gift suggestion(s) as an email message, text message, or social media message sent to the gift recipient;

receiving, on a merchant server, a gift purchase choice from the gift recipient selected from the one or more gift suggestion(s);

purchasing a gift corresponding to the gift purchase choice by the gift recipient through a gift giver financial account stored on a financial account server; and sending the gift and one or more of images, audio, and video corresponding to an occasion for the gift to the gift recipient.

2. The method of claim 1, wherein the one or more gift suggestion(s) for the gift recipient are determined by keywords or tags corresponding to the selected categories and subcategories of hobbies, interests, and personality features of the gift recipient.

3. The method of claim 2, wherein the keyword or tags are used in a search engine to determine the one or more gift suggestions(s) for the gift recipient.

4. The method of claim 3, wherein the search engine is hosted on or accesses content from the one or more web server(s).

5. The method of claim 3, wherein the search engine accesses content from a database of gift suggestions.

6. The method of claim 1, further comprising receiving a range or limit of the price of the gift suggestions, and determining and outputting the one or more gift suggestion(s) based on the range or limit.

7. The method of claim 1, wherein the one or more gift suggestions comprise a debit card or a gift card.

8. The method of claim 1, further comprising receiving, through one or more graphical user interface(s), input comprising one or more gift event information comprising an occasion or date of the gift event.

9. The method of claim 8, further comprising setting one or more reminders for purchasing one or more gift(s) for one or more gift event(s).

10. The method of claim 9, wherein the one or more reminders are sent by way of an email message, a text message, or a social media message.

11. The method of claim 1, further comprising sending one or more confirmation message chosen from an email message, a text message, and a social media message confirming purchase or delivery of the one or more gift(s).

12. One or more non-transitory, computer-readable storage media having instructions for execution by one or more processor(s), the instructions programmed to cause the one or more processor(s) to:

display a hierarchical questionnaire of categories of information of a gift recipient on one or more graphical user interface(s) on a smartphone screen of a gift giver, the hierarchical questionnaire capable of branching into multiple levels of more specific subcategories of information based on answers received, wherein displaying the hierarchical questionnaire comprises:

soliciting generic gift recipient hobby, interest, and personality information by:
displaying categories of hobbies, interests, and personality features; and
receiving as input from the gift giver one or more category selection from the displayed hobby, interest, and personality feature categories; and soliciting specific gift recipient hobby, interest, and personality information by:
displaying multiple first subcategories of the hobby, interest, and personality feature category or categories selected by the gift giver;
receiving as input from the gift giver one or more first subcategory selection from the displayed hobby, interest, and personality feature first subcategories; and
displaying multiple second subcategories based upon the selection of first subcategories;

receive as input, through the one or more graphical user interface(s) on the smartphone screen of the gift giver, additional gift recipient information comprising name, email address, mailing address, age, and gender;

send the input received from the one or more graphical user interface(s) on the smartphone screen of the gift giver to one or more web server(s) by way of a network connection;

determine, through one or more processor(s) of the one or more web server(s), one or more gift suggestion(s) for the gift recipient based on the received gift recipient information and categories and subcategories of hobbies, interests, and personality features;

output the one or more gift suggestion(s) as an email message, text message, or social media message sent to the gift recipient;

receive, on a merchant server, a gift purchase choice from the gift recipient selected from the one or more gift suggestion(s);

purchase a gift corresponding to the gift purchase choice by the gift recipient through a gift giver financial account stored on a financial account server; and send the gift and one or more of images, audio, and video corresponding to an occasion for the gift to the gift recipient.

13. A computer or computer system, comprising:
one or more processor(s) designed to execute instructions; and
one or more non-transitory, computer-readable memories storing program instructions for execution by the one or more processor(s), the instructions programmed to cause the one or more processor(s) to:

display a hierarchical questionnaire of categories of information of a gift recipient on one or more graphical user interface(s) on a smartphone screen of a gift giver, the hierarchical questionnaire capable of branching into multiple levels of more specific subcategories of information based on answers received, wherein displaying the hierarchical questionnaire comprises:

soliciting generic gift recipient hobby, interest, and personality information by:
displaying categories of hobbies, interests, and personality features; and
receiving as input from the gift giver one or more category selection from the displayed hobby, interest, and personality feature categories; and soliciting specific gift recipient hobby, interest, and personality information by:
displaying multiple first subcategories of the hobby, interest, and personality feature category or categories selected by the gift giver;
receiving as input from the gift giver one or more first subcategory selection from the displayed hobby, interest, and personality feature first subcategories; and displaying multiple second subcategories based upon the selection of first subcategories;

receive as input, through the one or more graphical user interface(s) on the smartphone screen of the gift giver, additional gift recipient information comprising name, email address, mailing address, age, and gender;

send the input received from the one or more graphical user interface(s) on the smartphone screen of the gift giver to one or more web server(s) by way of a network connection;

determine, through one or more processor(s) of the one or more web server(s), one or more gift suggestion(s) for the gift recipient based on the received gift recipient information and categories and subcategories of hobbies, interests, and personality features;

output the one or more gift suggestion(s) as an email message, text message, or social media message sent to the gift recipient;

receive, on a merchant server, a gift purchase choice from the gift recipient selected from the one or more gift suggestion(s);

purchase a gift corresponding to the gift purchase choice by the gift recipient through a gift giver financial account stored on a financial account server; and send the gift and one or more of images, audio, and video corresponding to an occasion for the gift to the gift recipient.

* * * * *